United States Patent
Wygnanski

(10) Patent No.: US 9,303,623 B2
(45) Date of Patent: Apr. 5, 2016

(54) VERTICAL AXIS WIND TURBINE

(75) Inventor: Israel J. Wygnanski, Tucson, AZ (US)

(73) Assignee: The Arizona Board of Regents on behalf of the University of Arizona, Tucson, AZ (US)

( * ) Notice: Subject to any disclaimer, the term of this patent is extended or adjusted under 35 U.S.C. 154(b) by 1221 days.

(21) Appl. No.: 13/132,863

(22) PCT Filed: Dec. 7, 2009

(86) PCT No.: PCT/US2009/067005
§ 371 (c)(1),
(2), (4) Date: Jun. 3, 2011

(87) PCT Pub. No.: WO2010/065956
PCT Pub. Date: Jun. 10, 2010

(65) Prior Publication Data
US 2011/0236181 A1 Sep. 29, 2011

Related U.S. Application Data

(60) Provisional application No. 61/201,041, filed on Dec. 5, 2008.

(51) Int. Cl.
*F03D 3/06* (2006.01)
*F03D 11/04* (2006.01)

(52) U.S. Cl.
CPC .............. *F03D 3/061* (2013.01); *F03D 11/04* (2013.01); *F05B 2240/122* (2013.01);
(Continued)

(58) Field of Classification Search
CPC .......... F03D 11/04; F03D 3/061; F03D 3/062; F03D 3/064; F03D 3/065; F05B 2260/601; F05B 2240/212; F05B 2240/917
USPC ........ 415/4.2, 4.4, 907, 914; 416/20 R, 20 A, 416/90 R, 90 A, 91, 92, 175, 203, 231 R, 416/231 B, 194, 195, 196 A, 198 R, 200 R, 416/201 A, 244 R, 197 A, 227 R, 227 A, 416/DIG. 6, 41
See application file for complete search history.

(56) References Cited

U.S. PATENT DOCUMENTS 154,407 A * 8/1874 Mason ...................... 416/200 A
2,485,543 A 10/1949 Andreau
(Continued)

FOREIGN PATENT DOCUMENTS

EP 0 206 750 12/1986
GB 2 296 048 6/1996

OTHER PUBLICATIONS

International Search Report issued in PCT/US2009/067005, dated Feb. 3, 2010, 2 pages.
(Continued)

*Primary Examiner* — Christopher Verdier
(74) *Attorney, Agent, or Firm* — Klarquist Sparkman, LLP

(57) ABSTRACT

A vertical axis wind turbine comprises upper and lower rotor blades and upper and lower bearing assemblies. Horizontal members connect the upper rotor blades to the upper bearing assembly and the lower blades connect the upper rotor blades to the lower bearing assembly. The upper rotor blades can be arranged vertically or non-vertically. In non-vertical arrangements, the upper rotor blades can be twisted or swept back in a straight manner. Sweeping jet actuators are incorporated into the rotor blades to deliver oscillating air jets to surfaces of the rotor blades to delay occurrence of dynamic stall. Conduits in the blades can deliver pressurized flow of air to the actuators. The turbine can be supported by a structure that can exerts only horizontal and/or lifting forces on the rotor blade assembly to reduce the load on the lower bearing.

17 Claims, 12 Drawing Sheets

(52) U.S. Cl.
CPC .... *F05B 2240/212* (2013.01); *F05B 2240/917* (2013.01); *F05B 2250/25* (2013.01); *F05B 2260/601* (2013.01); *Y02E 10/728* (2013.01); *Y02E 10/74* (2013.01)

(56) References Cited

U.S. PATENT DOCUMENTS

| | | | | |
|---|---|---|---|---|
| 3,144,220 | A * | 8/1964 | Kittelson | B64C 23/00 244/199.1 |
| 3,326,296 | A * | 6/1967 | Hill | B60V 1/043 114/67 A |
| 4,260,325 | A * | 4/1981 | Cymara | 415/4.4 |
| 4,293,274 | A | 10/1981 | Gilman | |
| 4,504,192 | A | 3/1985 | Cyrus et al. | |
| 4,650,403 | A * | 3/1987 | Takacs | 416/197 A |
| 4,808,074 | A * | 2/1989 | South | 416/227 R |
| 5,131,805 | A * | 7/1992 | Stevenson | 415/4.2 |
| 5,252,029 | A * | 10/1993 | Barnes | 416/227 A |
| 5,531,567 | A * | 7/1996 | Hulls | 416/227 A |
| 5,758,823 | A * | 6/1998 | Glezer | B64C 21/08 239/11 |
| 5,813,625 | A * | 9/1998 | Hassan et al. | 416/90 A |
| 2006/0140760 | A1 | 6/2006 | Saddoughi et al. | |
| 2008/0253889 | A1 | 10/2008 | Krivcov et al. | |
| 2008/0267777 | A1 * | 10/2008 | Lux | 416/132 B |

OTHER PUBLICATIONS

Written Opinion issued in PCT/US2009/067005, dated Feb. 3, 2010, 6 pages.

* cited by examiner

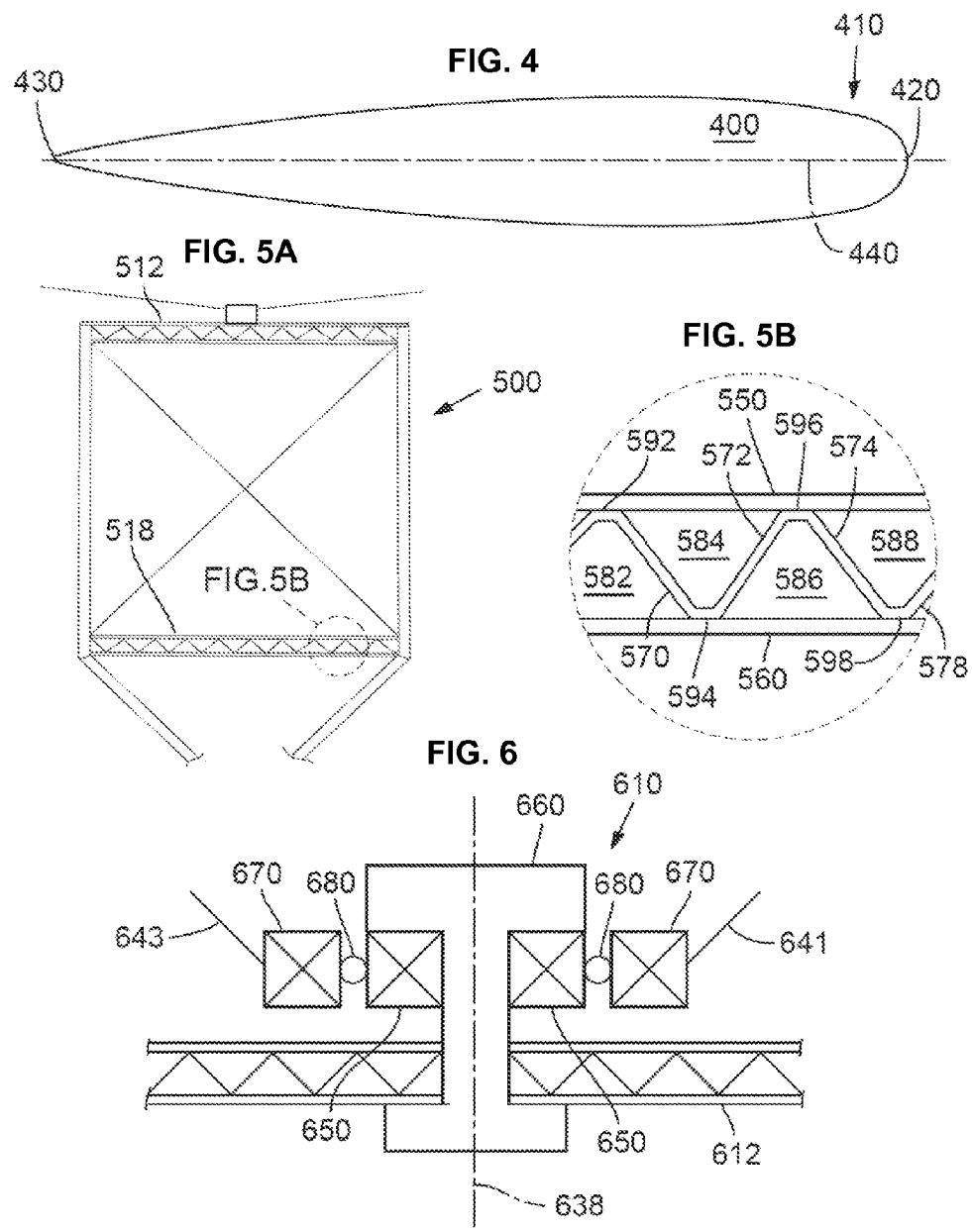

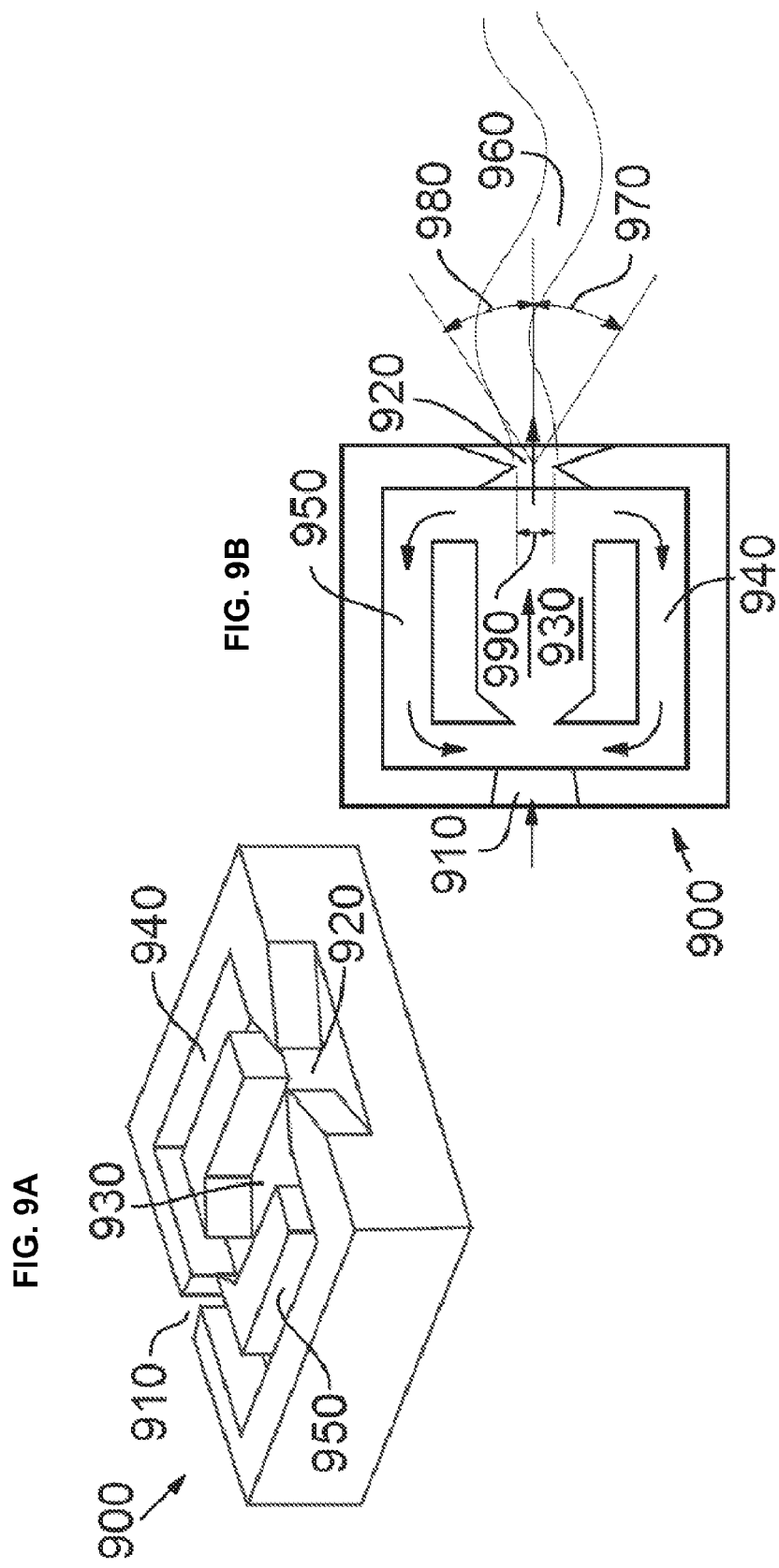

VERTICAL AXIS WIND TURBINE

CROSS REFERENCE TO RELATED APPLICATIONS

This is the U.S. National Stage of International Application No. PCT/US2009/067005, filed Dec. 7, 2009, which was published in English under PCT Article 21(2), which in turn claims the benefit of U.S. Provisional Application No. 61/201,041, filed Dec. 5, 2008, both of which are incorporated herein by reference in their entirety.

FIELD

The present disclosure relates to vertical axis wind turbines, and, more particularly, to vertical axis wind turbines with active flow control.

BACKGROUND

Conventional vertical axis wind turbines (VAWTs) are wind turbines that comprise multiple rotor blades that can rotate, when impinged upon by wind, about a vertical axial rotor shaft. One configuration that VAWTs can take is the conventional "egg-beater" Darrieus-type VAWT described in U.S. Pat. No. 1,835,018. VAWTs have several advantages over horizontal axis wind turbines. For example, VAWTs do not need to be pointed into the wind. Thus, they do not require complex yaw control mechanisms. Further, generators and gearboxes can be located close to the ground. This allows, for example, easy access to these components for maintenance and eliminates the need for a large support tower to hold these components off the ground.

However, VAWTs have susceptibilities of their own to overcome. VAWTs are typically supported by a set of guy-wires that hold the turbine in its vertical orientation and stabilize the VAWT against, for example, large gusts of wind and vibrations that occur as the rotor blades rotate. The guy-wires typically extend directly from the top of the vertical axial rotor shaft to the ground and exert compressive forces on the central tower supporting the turbine assembly. These forces are borne by the lower bearing assembly, which is already carrying the weight of the VAWT. This additional load can reduce the lifetime of the lower bearing assembly.

In addition, VAWTs are susceptible to dynamic stall. FIG. 1 shows a schematic transverse section of a VAWT with a rotor blade 110 located at various possible azimuthal angles 111-118 (θ=0°, 45°, 90°, 135°, 180°, 225°, 270°, and 315° respectively) about a vertical rotational axis 120. Eight blades are shown to illustrate eight respective azimuthal angles. In many embodiments, the transverse section at a given instant in time would reveal any two blades on opposing respective sides of the vertical axis 120, as will be described below. As the rotor blade 110 rotates clockwise about the vertical axis 120, the rotor blade 110 experiences varying angles of attack α relative to incident wind. The angle of attack α is the angle between the oncoming wind and the chord of the rotor blade. The oncoming wind vector is the vector sum of the incident wind velocity vector and the velocity of a rotating rotor blade. At low angles of attack, air flows smoothly over the surfaces of the rotor blade 110 and the blade experiences lift, which is useful for urging continued rotation of the blade 110 about the vertical axis 120. This lift increases with increasing angle of attack up to an angle at which flow separation begins at the rotor blade. When the flow of air begins to separate from a blade surface, lift no longer increases; in fact, lift may drop suddenly while large eddy currents are generated in the blade's wake. Thus, there is a critical angle of attack at which blade experiences maximum lift. As the angle of attack α continues to increase, the flow of air in the blade's wake becomes increasingly turbulent. At attack angles beyond the critical angle, the lift and pitching moments experienced by the blade 110 decrease sharply and are accompanied by a large increase in drag, as the rotor blade stalls. The ability of a VAWT to generate power is reduced whenever one or more rotor blades experience stall conditions, and rapid changes in the pitching moment can be destructive to the VAWT. Thus, it is desirable that stall conditions be avoided, or at least minimized.

VAWT stall conditions experienced by rotor blades are dynamic in that the blades can transition in and out of regions where stall conditions are experienced as the VAWT rotates about its vertical rotational axis 120. The regions where rotor blades experience stall conditions as it rotates about the vertical rotational axis 120 are referred to as "dynamic stall regions." Rotor blade 110 experiences dynamic stall regions 130, 140. The rotor blade 110 does not have to transition in and out of the dynamic stall regions 130, 140 at any specific azimuthal angles suggested by FIG. 1. Rather, FIG. 1 is meant to show that VAWT rotor blades experience stall conditions at the highest angles of attack, or, when the rotor blade 110 is at azimuthal angles in respective regions about θ=90 degrees and θ=270 degrees (FIG. 1). In this specification, the terms "stall" and "dynamic stall" are used interchangeably. In a conventional Darrieus VAWT design, dynamic stall can start near the top of a vertical axial rotor shaft (vertical support column) where the tip speed ratio (i.e., the ratio of the rotational speed of the rotor blades to the wind speed) is lowest. Thus, the upper portion of Darrieus VAWTs can operate in dynamic stall conditions for a large portion of time during each revolution.

One way of reducing dynamic stall is to reduce the angular width of the dynamic stall regions. To such end, the effects of various active flow control techniques on boundary layer separation have been studied. "Active flow control" refers to the injection or removal of air to the flow of air over an airfoil surface. For example, the application of periodic excitation (alternating blowing and suction) as an active control of separation technique on NACA 0015 airfoils has been studied. D. Greenblatt et al., "Dynamic Stall Control by Periodic Excitation, Part 1: NACA0015 Parametric Study" *Journal of Aircraft*, Vol. 38, pp. 430-439, 2001. In addition, flight tests have been performed to assess the effectiveness of using electromagnetic actuators for active flow control in tiltrotor aircraft. A. McVeigh et al., "Model and Full Scale flight Tests of Active Flow Control on a Tilt Rotor Aircraft," (presented at the American Helicopter Society 60th Annual Forum, Baltimore, Md., Jun. 7-10, 2004). However, these active flow control approaches involve the use of actuators that can be complex, heavy, and hard to maintain because of multiple moving parts and that require the consumption of power to operate. Thus, these approaches can be costly, in terms of both initial manufacturing and on-going maintenance expenses.

SUMMARY

A vertical axis wind turbine (VAWT) is presented that employs active flow control to reduce the effects of dynamic stall on turbine performance. The VAWT can comprise an array of rotor blades that are spaced apart equidistantly from the vertical rotational axis of the VAWT. Thus, the upper portion of a VAWT is less vulnerable to dynamic stall compared to upper portions of conventional Darrieus VAWTs. The rotor blades can be arranged vertically and parallel to each other. Alternatively, the rotor blades can be arranged in a non-vertical manner and can be twisted or swept back so that only a respective segment of each blade experiences dynamic stall at any moment in time as the blade travels through a revolution of the turbine.

In some embodiments, the VAWTs can be configured without a continuous axial shaft between the lower and upper bearing assemblies. The absence of an axial shaft reduces the loading on the lower bearing assembly and removes a source of vertical turbulent flow encountered by the rotor blades passing through the wake of the columnar axial support, reducing their effectiveness. The absence of an axial support can also reduce operational noise by eliminating the impingement of incident wake vortices generated by the axial shaft or impinging on it when generated by nearby structures (e.g., trees, hills, buildings, other wind turbines).

In other embodiments, the VAWT can be supported by multiple guy-lines that support an upper bearing assembly relative to the ground or other base structure. Each guy-line can be supported by a pole, structural truss, or the like that bears the compressive load of each guy-line. Thus, the guy-lines can be configured so as not to exert a downward force on the VAWT. Appropriate tensioning of the guy-lines during operation of the VAWT can reduce the load on the lower bearing assembly and increase its operational lifetime. Tensioning the guy-lines while the rotor blades of the VAWT are stationary can allow the VAWT to be lifted upward, for e.g., easier access to the lower bearing assembly for maintenance.

In yet other embodiments, active flow control mechanisms can be incorporated into the rotor blades to reduce the effects of or delay the onset of dynamic stall. The onset of dynamic stall is delayed in that a rotor blade comprising active flow control can enter a dynamic stall region at a higher angle of attack as compared to a blade that does not comprise active flow control. Dynamic stall regions 150, 160 in FIG. 1 reflect the portion of a revolution of a VAWT in which rotor blades incorporating active flow control encounter stall conditions. Dynamic regimes 150, 160 can be narrower, or comprise a smaller portion of a VAWT revolution, than the dynamic regimes 130, 140 associated with a conventional VAWT not comprising active flow control.

The active flow components can comprise sweeping jet actuators that are incorporated into the rotor blades. Sweeping jet actuators provide an oscillating air jet to outer and inner surfaces of a rotor blade, and operate to delay the onset of stall. By delaying the onset of dynamic stall, each rotor blade can generate lift over a greater portion of a VAWT revolution, thus increasing the power generated by the VAWT. Sweeping jet actuators provide advantages over other active flow control mechanisms in that they are light in weight, contain no moving parts, and need only a source of compressed air (concentrated stream or flow of air) to provide actuation.

The arrangement of sweeping jet actuators on the outer face of a rotor blade can be symmetric to the actuator arrangement on the inner face. Compressed air can be delivered to the actuators by conduits extending through the rotor blades. The output jets of the actuators can also supply sufficient thrust to initiate rotation of the rotor blades at weak wind conditions.

The foregoing and other objects, features and advantages of the invention will become more apparent from the following detailed description, which proceeds with reference to the accompanying figures.

BRIEF DESCRIPTION OF THE DRAWINGS

FIG. 4 shows a cross-section of a first embodiment of a VAWT rotor blade.

FIG. 5A shows a portion of a first embodiment of a rotor blade assembly.

FIG. 5B shows a portion of the lower horizontal member of the exemplary rotor blade assembly of FIG. 5A.

FIG. 6 is a schematic diagram of a first embodiment of an upper bearing assembly connected to an upper horizontal member.

FIG. 9A shows a perspective view of a first embodiment of a sweeping jet actuator.

FIG. 9B shows a top view of a first embodiment of a sweeping jet actuator.

DETAILED DESCRIPTION

As used in this application and in the claims, the singular forms "a," "an," and "the" include the plural forms unless the context clearly dictates otherwise. Additionally, the term "includes" means "comprises." Further, the terms "coupled," "connected," and "associated" generally mean electrically, electromagnetically, and/or physically (e.g., mechanically or chemically) coupled or linked and does not exclude the presence of intermediate elements between the coupled or associated items absent specific contrary language. Moreover, terms modified by the word "substantially" include arrangements, orientations, spacings or positions that vary slightly from the meaning of the unmodified term. For example, substantially vertical rotor blades include rotor blades that are arranged within a few degrees of vertical.

The described systems, apparatus and methods described herein should not be construed as being limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures cannot show the various ways in which the disclosed systems, methods and apparatus can be used in conjunction with other systems, methods and apparatus. Additionally, the description sometimes uses terms like "produce" and "provide" to describe the disclosed methods. These terms are high-level abstractions of the actual operations that are performed and the results of operations. The actual operations that correspond to these terms will vary depending on the particular implementation and are readily discernible by one of ordinary skill in the art.

Theories of operation, scientific principles or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Figure 2:
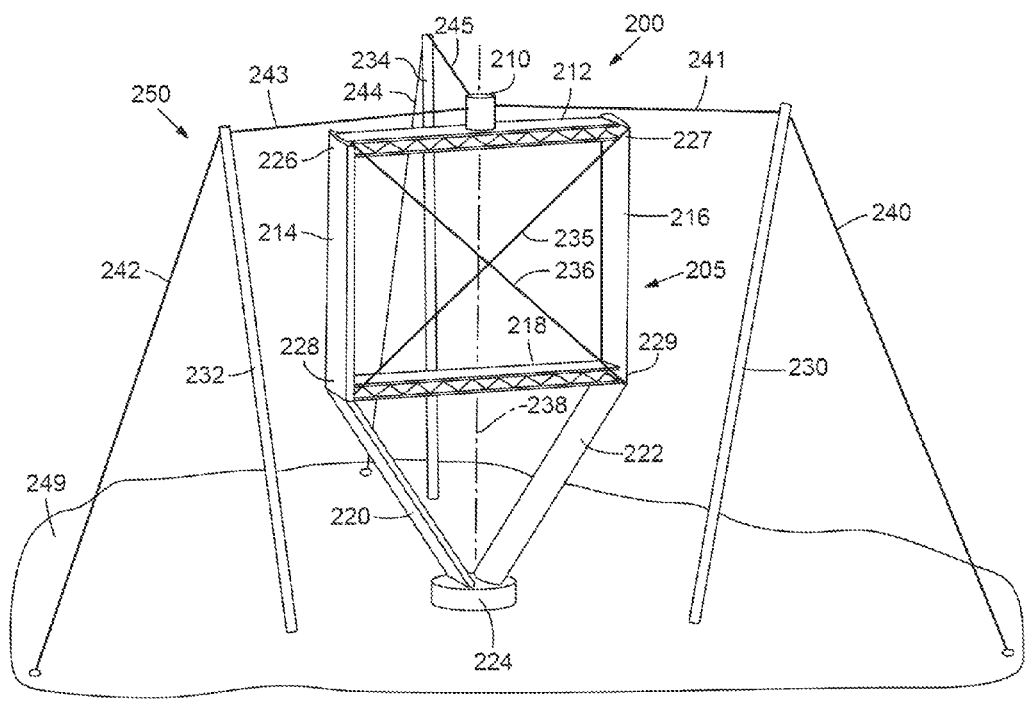
FIG. 2 shows a first embodiment of a VAWT and a support structure.

Turning now to the drawings, FIG. 2 shows a first embodiment of a vertical axis wind turbine (VAWT) 200. The VAWT 200 comprises an upper bearing assembly 210, a lower bearing assembly 224 and a rotor blade assembly 205. The upper and lower bearing assemblies 210, 224 are arranged on a vertical rotational axis 238. Although the lower bearing assembly 224 is shown mounted directly on the ground, it alternatively can be mounted on a base mounted to ground, or on a pedestal, column or other structure 249. The rotor blade assembly 205 comprises one or more upper horizontal members 212, a pair of upper rotor blades 214, 216, one or more lower horizontal members 218, and a pair of lower rotor blades 220, 222. The upper rotor blades 214, 216 comprise upper ends 226, 227, respectively, and lower ends 228, 229, respectively. The one or more upper horizontal members 212 are coupled to the upper ends 226, 227 of the upper rotor blades 214, 216, and the one or more lower horizontal members 218 are coupled to the lower ends 228, 229 of the upper rotor blades 214, 216. The upper bearing assembly 210 is mounted at about mid-length to the one or more upper horizontal members 212. The lower rotor blades 220, 222 connect the upper rotor blades 214, 216 to the lower bearing assembly 224. The rotor blade assembly 205 rotates about the vertical rotational axis 238 when impinged upon by wind. Although two upper rotor blades 214, 216 and two lower rotor blades 220, 222 are shown, the VAWT 200 can comprise more than two upper rotor blades and more than two lower rotor blades. The number of upper rotor blades and the number of lower blades need not be equal.

In some embodiments, the rotor blade assembly further comprises one or more braces, each brace connecting the leading edge of a first upper blade to the trailing edge of a second upper blade located opposite the first upper blade. For example, VAWT 200 comprises diagonal braces 235, 236 to reinforce the rotor blade assembly 205. Each brace 235, 236 connects the upper leading edge of one respective upper rotor blade to a diagonally opposite trailing edge (lower) of an oppositely located rotor blade. For example, brace 235 connects the trailing edge of upper rotor blade 216 to the leading edge of upper rotor blade 214. The braces 235, 236 can absorb and/or prevent pitching moment oscillations due to wind pressure variances experienced by a rotor blade rotating about the vertical axis 238.

The upper rotor blades 214, 216 are substantially vertical and substantially parallel to the vertical rotational axis 238. The upper rotor blades 214, 216 are substantially equidistant from the vertical axis 238 along their length. Accordingly, the VAWT 200 can be less vulnerable to dynamic stall than a conventional Darrieus VAWT configuration in which the rotor blades converge at the upper bearing assembly. As will be discussed later below, the application of active flow control to at least the upper rotor blades can delay occurrence of dynamic stall, enabling the VAWT 200 to operate effectively at higher wind speeds.

The lower rotor blades 220, 222 operate, in part, to provide respective conduits for delivering flow of pressurized air. As described later below, the flow of pressurized air can be used by sweeping jet actuators or other fluidic approaches in the upper rotor blades, for example, to achieve active flow control. The lower rotor blades 220, 222 also support the upper rotor blades 214, 216 and place the upper rotor blades 214, 216 at an elevation above all or a portion of the ground boundary layer (the region of air near the ground that exhibits turbulent flow due to uneven terrain, man-made structures, trees, etc.). Thus, the upper rotor blades 214, 216 are usually located in a region of the atmosphere containing stronger, more sustained and/or steadier winds. Although FIG. 2 shows straight lower rotor blades 220, 222, the lower rotor blades can curve inward or outward relative to the vertical axis 238, or have other shapes. The lower rotor blades 220, 222 can be airfoil-shaped along their length, or for only a portion of their length, such as on the upper region of their length.

The blade assembly 205 is self-supporting. That is, the VAWT 200 is structured so as not to require an axial shaft, mast, tower or other support extending from the lower bearing assembly 224 to the upper horizontal member 212. The absence of a continuous axial support reduces the detrimental effects of upstream turbulence on the upper and lower rotor blades passing in the wake of (through a region downstream from) an axial support. Further, the absence of an axial support can also reduce operational noise by eliminating the impingement of vortices in the incident wind on the VAWT 200. Moreover, the elimination of an axial shaft can reduce the weight of the VAWT 200 and reduce the load imposed on the lower bearing assembly 224.

The VAWT 200 is supported by a support structure 250 comprising guy-lines or guy-wires 240-245 and supports 230, 232, 234. The guy-lines are arranged around the vertical rotational axis 238 at equal azimuthal angular spacings. For example, the three guy-lines 240, 242, 244 can be located at approximately 120-degree intervals about the vertical rotational axis 238. The support structure 250 connects and anchors the VAWT 200 to the ground, base, platform or other surface 249 on which the VAWT 200 is located and stabilizes the VAWT 200. For example, the support structure 250 reduces horizontal loading and load oscillations on the lower bearing assembly 224 resulting from wind gusts, physical vibrations of the VAWT due to rotation of the rotor blades 214, 216, 220, 222, etc. The guy-lines 241, 243, 245 connect the upper bearing assembly 210 to the supports 230, 232, 234, respectively, and the guy-lines 240, 242, 244, connect the supports 230, 232, 234, respectively, to the ground, base or platform 249. In some embodiments, a VAWT can comprise a plurality of angularly spaced supports spaced substantially equi-angularly about and relative to the vertical rotational axis and connected to and extending upward from a base on which the VAWT is located, and a plurality of guy-lines connecting the upper bearing assembly to the base on which the VAWT is located, each guy-line being supported by a respective support. In some embodiments, the guy-lines 240-245 can run through respective pulleys or the like located at the top of each of the supports 230, 232, 234. In this embodiment, the tension in each guy-wire is continuous and is manifested as compression in the supports 230, 232, 234. The support structure 250 also prevents the guy-lines 240-245 from physically interfering with a rotating rotor blade assembly 205.

In the depicted embodiment, the support structure 250 avoids exerting a significant net downward force on the upper bearing assembly 210. The guy-lines 241, 243, 245 are supported by supports 230, 232, 234, respectively, at substantially the same elevation as the location at which the guy-lines 241, 243, 245 are each connected to the upper bearing assembly 210. Thus, the forces exerted by the guy-lines 241, 243, 245 on the upper bearing assembly 210 lack a downward vertical component. Accordingly, the support structure 250 does not increase the load borne by the lower bearing assembly 224.

Figure 3:
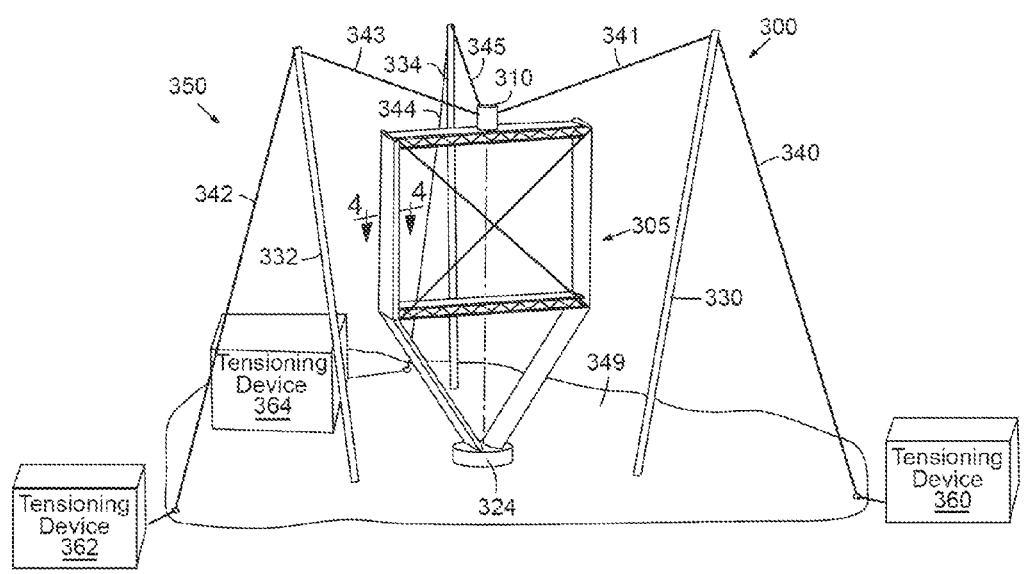
FIG. 3 shows a second embodiment of a VAWT and a support structure capable of bearing a portion of the weight of the VAWT.

An alternative VAWT configuration is shown in FIG. 3, which shows a VAWT 300 comprising a rotor blade assembly 305, an upper bearing assembly 310 and a lower bearing assembly 324. The VAWT 300 is connected to the ground or a base 349 by a support structure 350 comprising guy-lines 340-345 and supports 330, 332, 334. Each guy-line 341, 343, 345 is supported by a respective support 330, 332, 334 at a higher elevation than the location at which the guy-line is connected to the upper bearing assembly 310. Thus, the guy-lines 340-345, when sufficiently tensioned, collectively impart a net positive (upward) vertical force on the rotor blade assembly 305. Thus, the support structure 350 bears a portion of the weight of the blade assembly 305 and reduces the load on the lower bearing assembly 324. The support structures 250, 350 of these two embodiments can significantly reduce the wear on VAWT lower bearing assemblies and extend their lifetime.

Tensioning devices 360, 362, 364 can be used to apply tension to the guy-lines 340-345. The tensioning devices 360, 362, 364 can comprise winches or other devices for applying tension to a guy-line or any other connecting member in a support structure. In some embodiments, the guy-lines 340, 342, 344 can be connected to a single tensioning device. The tensioning devices 340, 342, 344 sufficiently tension the guy-lines 340-345 to reduce the load on the lower bearing assembly 324 while the VAWT is operating (i.e., the blade assembly is rotating). In some embodiments, the tensioning devices 360, 362, 364 can be operated to apply, as required, sufficient tension to temporarily raise the blade assembly 305 from the ground or base 349 for ease of maintenance or other activities to be performed on the VAWT 300. In other embodiments, the blade assembly 305 can be detached from the lower bearing assembly 324, as the rotor blade assembly 305 is raised upward in response to a sufficient lifting force applied by the support structure 350.

In an exemplary method of operating a VAWT, the guy-lines of a support structure can be tensioned such that they collectively impart a lifting force on the VAWT rotor blade assembly. The tension can be imparted while the rotor blade assembly is rotating about the vertical rotational axis when the rotor blades are stationary (i.e., not rotating). When the rotor blade assembly 305 is stationary, the lifting force can be sufficient to temporarily raise the blade assembly upward.

In any of the examples described herein, the support structure can comprise more than three supports, and each support can be connected with additional guy-lines or other bracing mechanisms to further reinforce the support structure. Each support can be a more complex structure than the respective poles shown in FIGS. 2 and 3. For example, each support can be a structural truss. Horizontal guy-wires (not shown) can connect the tops of the supports 330, 332, 334 to each other to change the inclination of these supports relative to the ground and thus change the height of the supports.

FIG. 4 shows a cross-sectional view of a first embodiment of a VAWT rotor blade 400. The blade 400 has a leading edge 420, a trailing edge 430, and a leading edge portion 410. The chord 440 of the blade 400 extends from the center of curvature of the leading edge 420 to the trailing edge 430. Rotor blades with thicker leading edges 420 can be used to prevent flow separation at higher angles of attack. The rotor blade 400 can be, for example, a Liebeck airfoil.

FIGS. 5A and 5B show detailed views of a first embodiment of upper and lower horizontal members of a VAWT. FIG. 5A is an elevational view of the upper portion of a first embodiment of a VAWT blade assembly 500 comprising an upper horizontal member 512 and a lower horizontal member 518. FIG. 5B shows a portion of the lower horizontal member 518. Each horizontal member 512, 518 is a truss comprising an upper plate 550 connected to a lower plate 560 by an array of diagonal supports 570, 572, 574, 578, etc. The diagonal supports define voids 582, 584, 586, 588. The diagonal supports 570, 572, 574, 578 are, for example, respective portions of a continuous metal sheet that has been bent to provide surfaces 592, 594, 596, 598 for attachment to the plates 550, 560. Thus, the lower horizontal member 518 configured as a truss provides mechanical strength at low weight and low aerodynamic drag. The upper horizontal member 512 can also be a truss having the same form as the lower horizontal member 518. The upper and lower horizontal members 512, 518 can be any type of truss or other structural form that provides mechanical strength, low weight, and low aerodynamic drag (i.e., high strength-to-mass ratio).

FIG. 6 shows a first embodiment of an upper bearing assembly 610 of a VAWT that is not supported by a continuous vertical shaft between the upper and lower bearing assemblies. The upper bearing assembly 610 comprises a vertical member 660, an outer bearing ring 670 and an inner bearing ring 650. The outer bearing ring 670 is held stationary by multiple (generally three or more) guy-lines 641, 643 and is coupled to the inner bearing ring 650 by bearings 680. The vertical member 660 is connected to the inner bearing ring 650 and an upper horizontal member 612. The inner bearing ring 650 moves relative to the outer bearing ring 670 when the VAWT rotates about its vertical rotational axis 638, allowing the inner bearing ring 650, the vertical member 660 and the upper horizontal member 612 to rotate together about the vertical axis 638. The upper bearing assembly 610 can comprise a ball bearing, roller bearing, or other type of bearing strong enough to support both the radial load of guy-lines 641, 643 and the axial load of a VAWT rotor blade assembly. Both the axial and radial loads can be significant as the guy-lines can be collectively tensioned to impart a sufficient lifting force to raise the VAWT rotor blade assembly upward. In other embodiments, the upper bearing assembly can be a thrust bearing. In still other embodiments, the upper bearing assembly can be a fluid bearing such as an air bearing. The lower bearing assembly can comprise a ball or roller bearing, a thrust bearing, a fluid bearing (such as an air bearing), or any other type of bearing as well.

FIGS. 7 and 8 show additional VAWTs embodiments that do not comprise an axial shaft extending between upper and lower bearing assemblies. FIGS. 7A and 7B show side and top views, respectively, of a VAWT 700 comprising twisted upper rotor blades 730, 740. The upper and lower horizontal members 710, 720 are angularly offset from each other by an azimuthal angle 750 (FIG. 7B). Although an offset angle 750 of approximately 90 degrees is shown, the horizontal members 710, 720 can be offset by other angles. Each upper rotor blade 730, 740 is twisted as it extends from the upper horizontal member 710 to the lower horizontal member 720. Thus, the azimuthal angle of each upper rotor blade 730, 740 varies along the respective length of each blade. Accordingly, the angle of attack varies along the rotor blade length. For instance, with reference to FIG. 1, an upper portion of rotor blade 740 could be at position 114 and have an angle of attack $\alpha_1$, a middle portion could be at position 115 and have an attack angle $\alpha_2 \approx$ zero and a lower portion could be at position 116 and have an attack angle $\alpha_3$. Each twisted rotor blade 730, 740 is equidistant from the vertical rotational axis 755 of the VAWT 700 along the length of the rotor blade.

Figure 1:
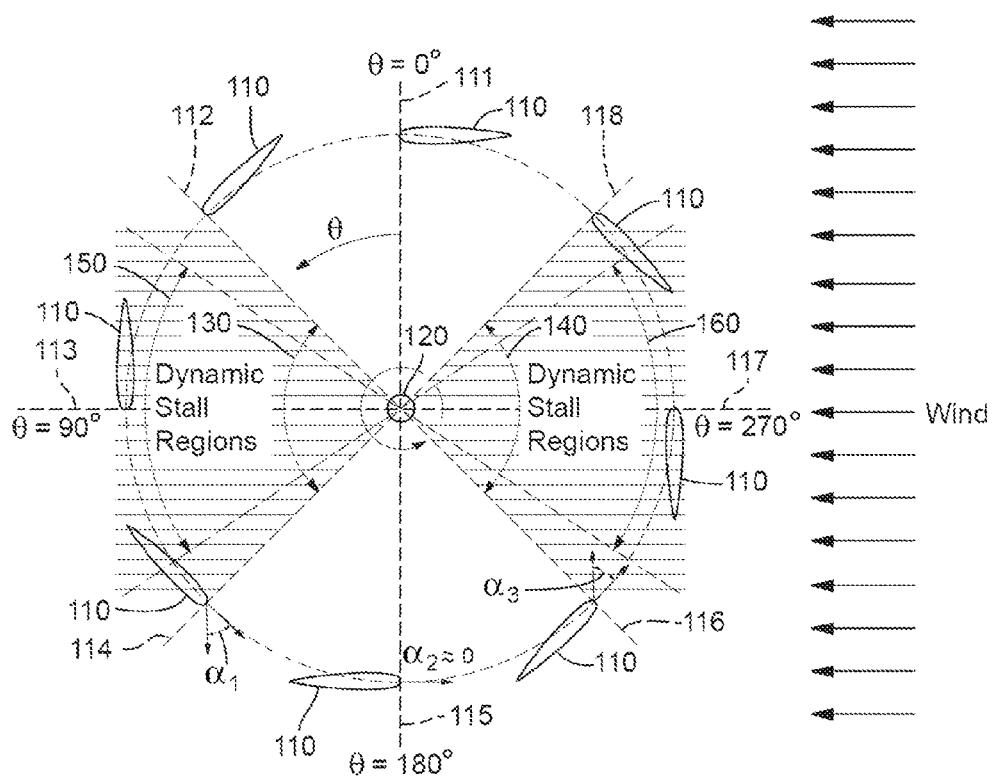
FIG. 1 shows a top view of a rotor blade located at various positions about a vertical rotational axis of a VAWT; the vertical rotational axis is normal to the plane of the page

The VAWT 700 can be configured such that the angular offset angle 750, which is also the azimuthal the angle over which each rotor blade 730, 740 extends, is greater than the angles associated with the dynamic stall regions (i.e., angles 130, 140, 150, 160 of FIG. 1). Accordingly, only a portion of each rotor blade 730, 740, and not the entire length thereof, can be in the dynamic stall region at any given time while the VAWT 700 is rotating. This can reduce operational vibrations produced by the VAWT 700.

Figure 7A:
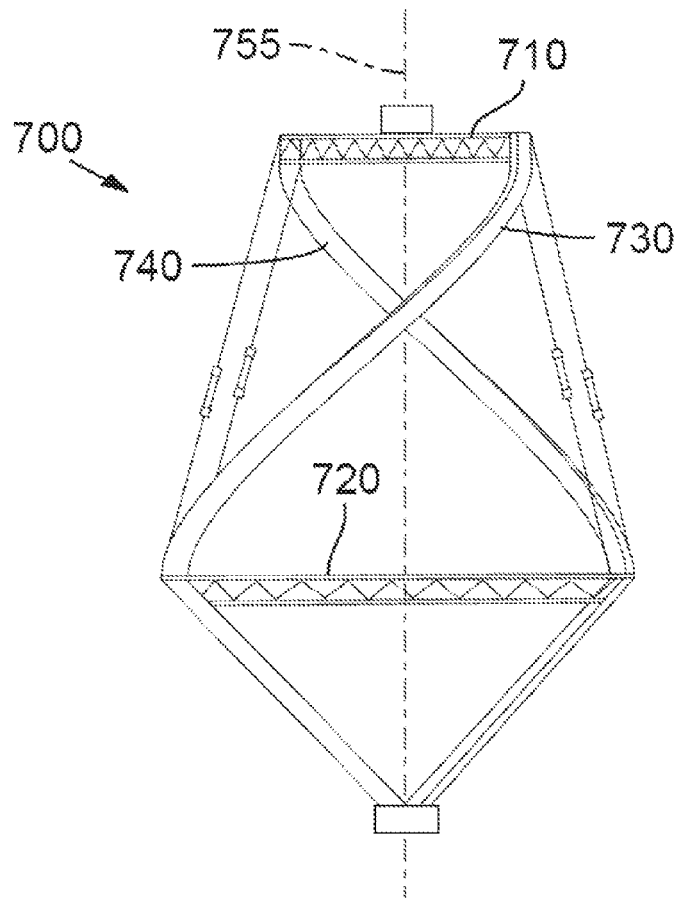
FIG. 7A shows a side view of a third embodiment of a VAWT comprising twisted upper rotor blades.
Figure 7B:
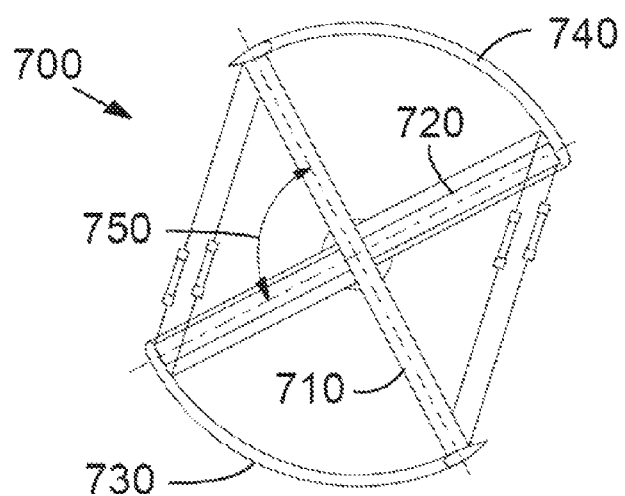
FIG. 7B shows a top view of a third embodiment of a VAWT comprising twisted lower rotor blades.
Figure 7C:
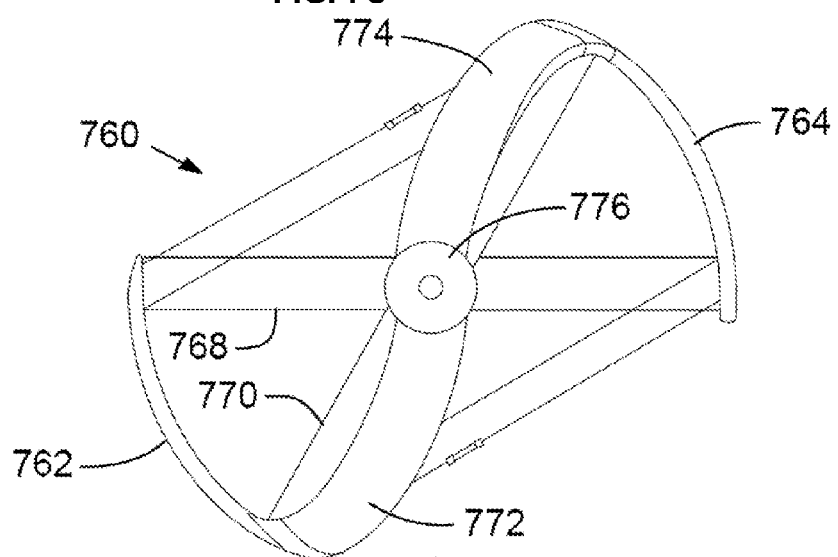
FIG. 7C shows a bottom view of a fourth embodiment of a VAWT comprising twisted upper and lower rotor blades.
Figure 7D:
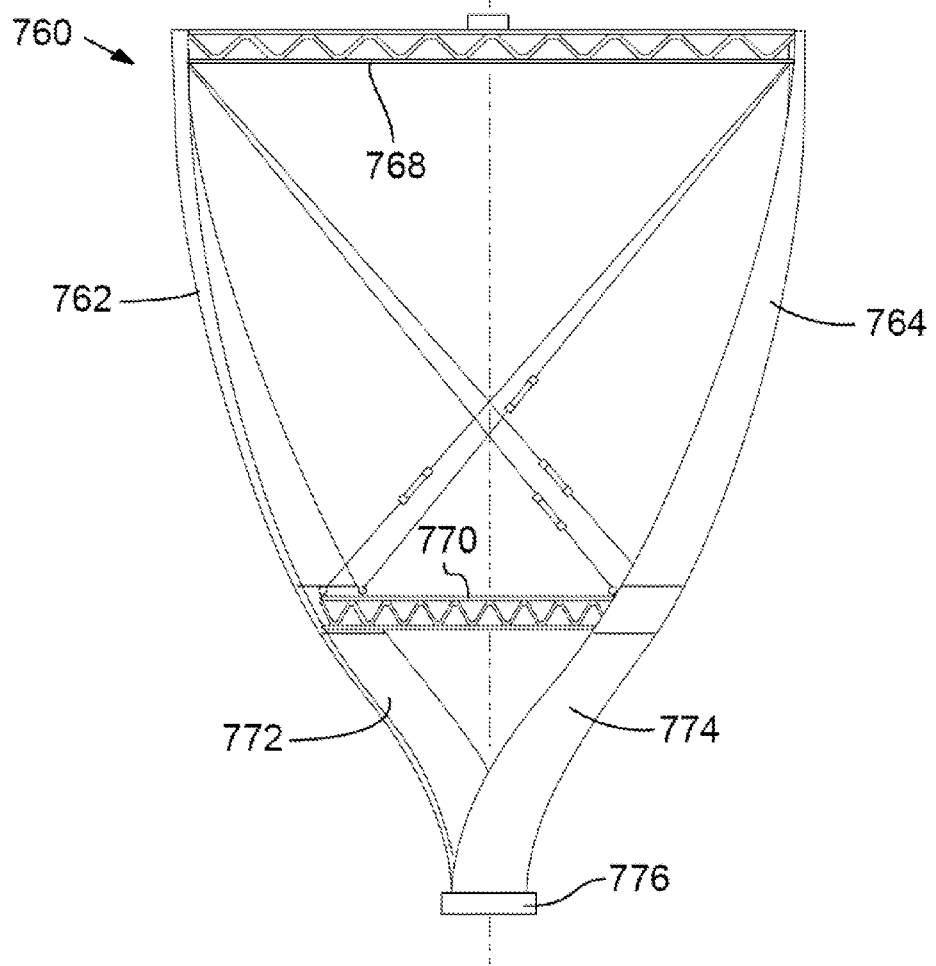
FIG. 7D shows a perspective view of a fourth embodiment of a VAWT comprising twisted upper and lower rotor blades.
Figure 7E:
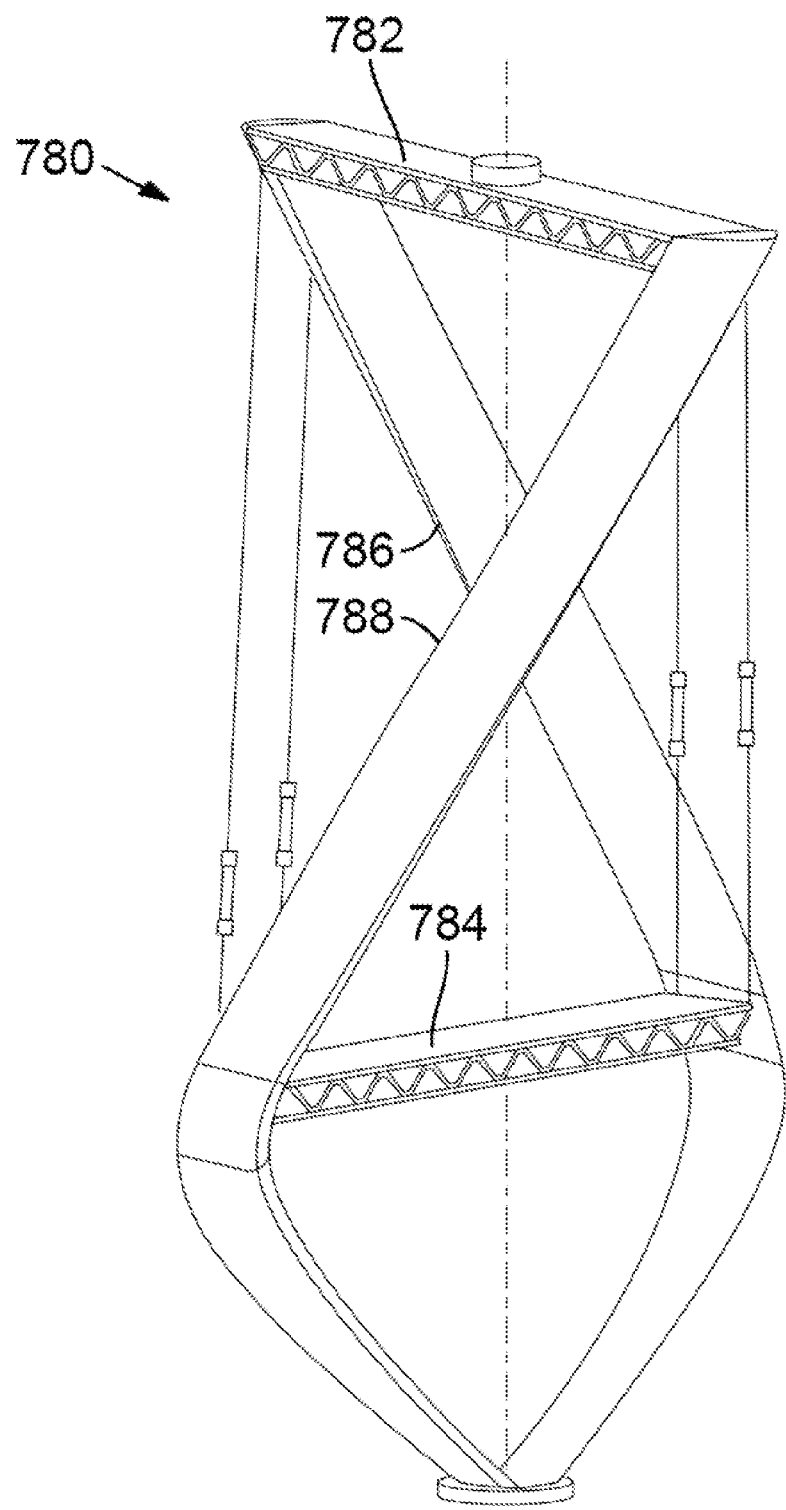
FIG. 7E shows a perspective view of a fifth embodiment of a VAWT comprising straight swept-back upper rotor blades.

FIGS. 7C-7E show two additional VAWT embodiments. FIGS. 7C and 7D show bottom and side views, respectively, of a VAWT 760 comprising upper rotor blades 762, 764 coupled to an upper horizontal member 768 and a lower horizontal member 770. Lower rotor blades 772, 774 are coupled to the lower horizontal member 770 and a lower bearing assembly 776. Each of the upper and lower blades 762, 764, 772, 774 is twisted. Viewed from the bottom of the VAWT 760, the blades 762 and 772 form a first "S" shape extending from the upper horizontal member 768 to the lower bearing assembly 776, and blades 764 and 774 form a second "S" shape. As a result of using twisted lower rotor blades 772, 774, only a portion of the lower rotor blades is in a dynamic stall region at any given time while the VAWT 760 is operating. FIG. 7E shows a VAWT 780 comprising straight, sweptback upper rotor blades 786, 788 connected to angularly offset upper and lower horizontal members 782, 784, respectively.

Figure 8A:
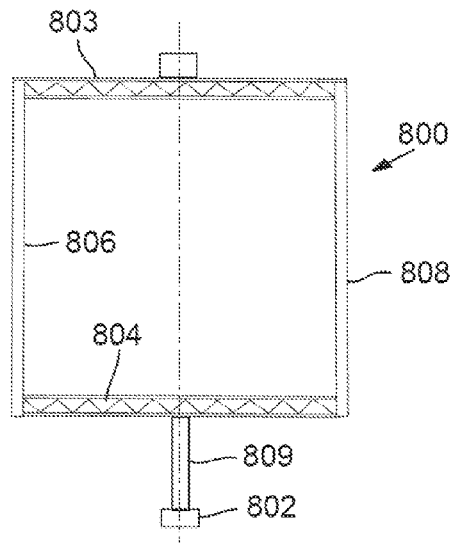
FIG. 8A shows a side view of a sixth embodiment of a VAWT comprising an axial shaft connecting a lower horizontal member to a lower bearing assembly.
Figure 8B:
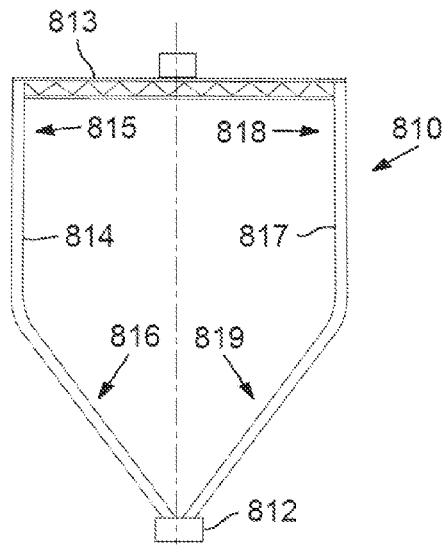
FIG. 8B shows a side view of a seventh embodiment of a VAWT comprising continuous rotor blades connecting an upper horizontal member to a lower bearing assembly.
Figure 8C:
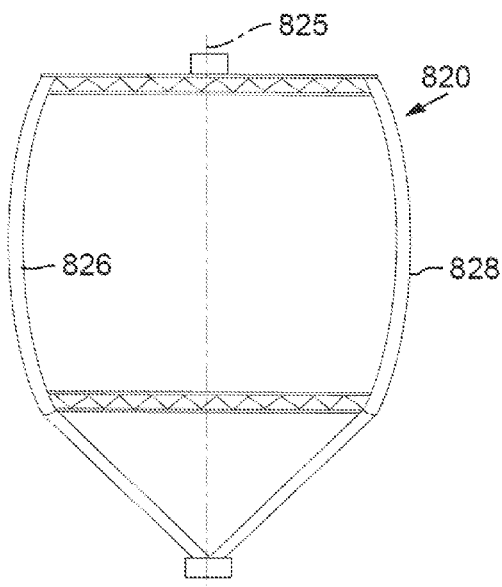
FIG. 8C shows a side view of an eighth embodiment of a VAWT comprising bowed upper rotor blades.
Figure 8D:
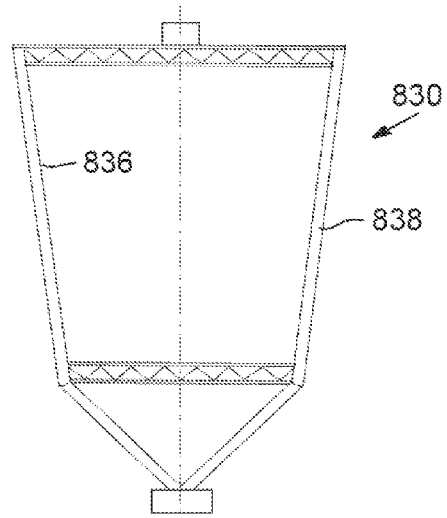
FIG. 8D shows a side view of a ninth embodiment of a VAWT comprising a trapezoidal rotor blade assembly.

FIG. 8A shows a VAWT embodiment 800 comprising vertically arranged rotor blades 806, 808 respectively connected by upper and lower horizontal members 803, 804, respectively. The lower horizontal member 804 is connected to a lower bearing assembly 802 by a vertical axial shaft 809. FIG. 8B shows a VAWT embodiment 810 comprising rotor blades 814, 817 connected at their respective upper ends by a horizontal member 813. The lower ends of the rotor blades 814, 817 connect to a lower bearing assembly 812. The rotor blades 814, 817 comprise substantially vertical upper portions 815, 818, respectively, connected to angled lower portions 816, 819, respectively. FIG. 8C shows a VAWT embodiment 820 comprising upper rotor blades 826, 828 that bow outward from the vertical rotational axis 825. FIG. 8D shows a VAWT embodiment 830 comprising straight, angled upper rotor blades 836, 838 to produce a trapezoidal rotor blade assembly.

Any of the VAWTs as described herein can comprise rotor blade configurations other than those shown in FIGS. 7 and 8. For example, the rotor blade configurations in any of the embodiments shown in FIG. 8 can be combined to produce other VAWT embodiments. For instance, the upper rotor blade portions 815, 818 shown in FIG. 8B could be bowed similarly to the upper rotor blades 826, 828 shown in FIG. 8C. Alternative VAWT configurations can comprise more than two rotor blades and can be supported by any of the various support structures described herein.

As mentioned above and as described below, the blades of a VAWT can employ various active flow control techniques to delay the occurrence of (or narrow the window of) dynamic stall. For example, blowing or suction of air, electromagnetic actuation or any other fluidic, mechanical or electric device that delays dynamic stall can be used for active flow control. A particularly advantageous active flow control technique comprises the incorporation of sweeping jet actuators into VAWT rotor blades. Sweeping jet actuators receive and convert an incoming flow of compressed air into a jet of air that oscillates, or sweeps back and forth, at an output nozzle. Because sweeping jets are simple mechanical structures that have no moving parts, they are lighter, less expensive and more robust than other active flow control approaches (i.e., periodic excitation, electro-magnetic actuators).

FIGS. 9A and 9B show perspective and top views, respectively, of a first embodiment of a sweeping jet actuator 900. The sweeping jet actuator 900 operates to convert a flow of air (indicated by arrows in FIG. 9B) provided at an input 910 into an oscillating, or sweeping, jet of air 960 output at a nozzle 920. These sweeping jets act as vortex generators, creating streamwise vortices that delay or prevent the air boundary layer from separating from the surface of a rotor blade. The output jet 960 oscillates between two divergent angles 970, 980. The frequency of output jet oscillation and the magnitude of the angles 970, 980 can be varied depending on the configuration of the sweeping jet actuator 900 (e.g., output nozzle width, relative shape and size of chambers 930, 940, 950, etc.) and the airflow rate delivered to the input port 910. In one embodiment, the width 990 of the output nozzle can be 0.005". The sweeping character of the output flow 960 is achieved by incorporating fluidic feedback loops, enabled by chambers 940, 950, into the sweeping jet actuator 900. It is to be understood that the term "sweeping jet actuator" is not limited to the actuator configuration shown in FIGS. 9A-9B, but rather encompasses any device that provides an oscillating fluidic output in response to a flow of air applied to an input port by way of fluidic feedback.

Figure 10A:
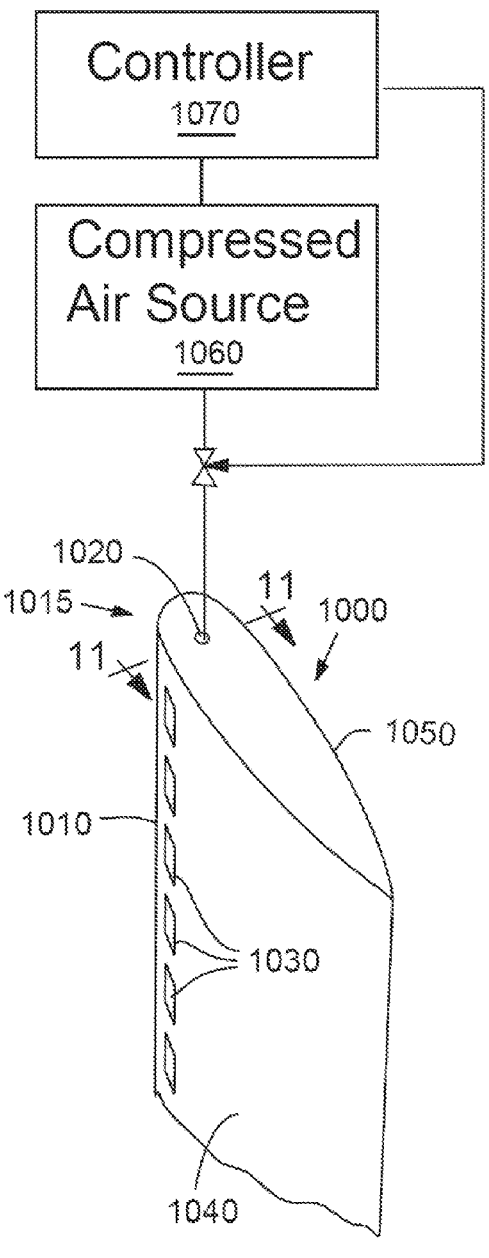
FIG. 10A shows a perspective view of an outer face of a first embodiment of a rotor blade incorporating sweeping jet actuators.
Figure 10B:
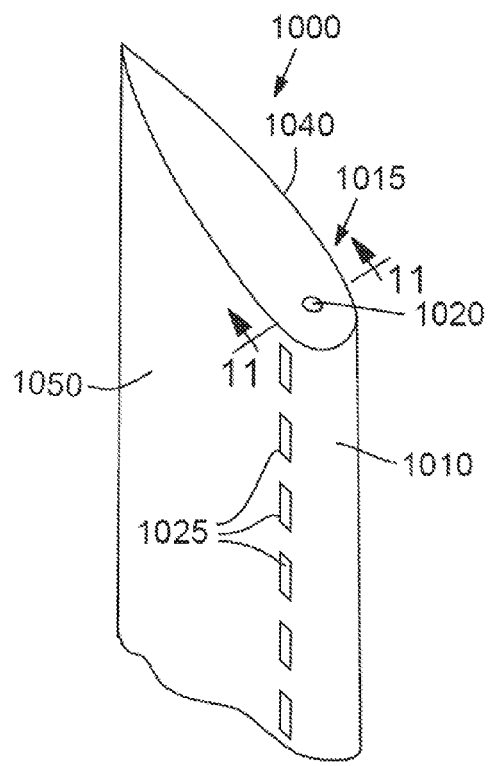
FIG. 10B shows a perspective view of an inner face of a first embodiment of a rotor blade incorporating sweeping jet actuators.

FIGS. 10A and 10B show perspective views of a portion of a VAWT rotor blade 1000 comprising sweeping jet actuators incorporated into a leading edge portion 1015 of the rotor blade 1000. The rotor blade 1000 can be any rotor blade of any VAWT described herein (e.g., upper rotor blades 214, 216, lower rotor blades 220, 222 of VAWT 200 in FIG. 2). It is to be understood that the sweeping jet actuators are "incorporated" into the leading edge portion 1015 in that they are located in a portion of the body of the rotor blade 1000 near or at the leading edge 1010, and that the actuators are incorporated into the rotor blade 1000. The sweeping jet actuators can be fabricated and incorporated into the rotor blade 1000 in various ways. For example, the rotor blade 1000 can be fabricated with one or more slots (not shown) extending along the length of the rotor blade near the leading edge 1010 of the rotor blade 1000. Each slot can be configured to receive a sheet-like unit of material (metal, plastic, etc.) into which one or more sweeping jet actuators have been incorporated. The actuators can be arranged at a fixed or at variable intervals along the length of the rotor blade 1000 or along a portion of the blade length.

In FIGS. 10A and 10B, output ports 1030, 1025 corresponding to individual actuator output ports or nozzles can be seen. Sweeping jet actuators are arranged to output air jets along both an inner face 1050 and an outer face 1040 as the rotor blade 1000 can stall due to layer separation on either face 1040, 1050. The outer face 1040 faces away from the vertical rotational axis of a VAWT, and the inner face 1050 faces towards the vertical rotation axis. Accordingly, the output ports 1030 are located on the outer face 1040 of the rotor blade 1000 and the output ports 1025 are located on the inner face 1050. Each upper rotor blade can comprise one or more sweeping jet actuator output nozzles located on the respective outer face arranged symmetrically to one or more sweeping jet actuator output nozzles located on the respective inner face.

Generally, the actuators can be arranged such that, when actuated, the output air jets emanate from respective rows of actuators symmetrically placed relative to the airfoil chord. That is, the output ports 1030 on the outer face 1040 are symmetric to the output ports 1025 on the inner face 1050. The output ports 1025 are arranged in a row on the outer face 1040 and the output ports 1030 are arranged in a row on the inner face 1050. The output nozzles are offset from the normal of the rotor blade surface by an angle of approximately between 20 degrees and 90 degrees such that the output jets are directed toward the trailing edge of the blade. In some embodiments, the actuators are offset from the surface normal by an angle of approximately 30 degrees. A flow of air is delivered to the actuators by a conduit 1020 that extends lengthwise along the rotor blade 1000.

The conduit 1020 of this embodiment is connected to a source of compressed air 1060 or other source of pressurized air flow. The compressed air source 1060 can be an air compressor, another wind turbine, etc. The compressed air source 1060 can be external to the VAWT and delivered to a rotor blade conduit 1020 by routing the compressed air through the VAWT assembly itself. For example, with reference to FIG. 2, compressed air can be delivered to the upper rotor blades 214, 216 from a source of compressed air external to the VAWT 200 as follows. The compressed air can flow from the compressed air source to one or more main conduits in the lower bearing assembly 224, through the one or more main conduits to one or more conduits extending lengthwise through each of the lower rotor blades 220, 222, and to one or more conduits extending through each of the upper rotor blades 214, 216 to the sweeping jet actuators.

The flow of air to the sweeping jet actuators can be controlled by a controller 1070. The controller 1070 can start or stop the flow of air, and vary the pressure of the flow of air that is delivered. In one embodiment, by way of example, the pressure of the air is supplied to the input ports of the sweeping jet actuators at a pressure of approximately 20-40 psi. The controller 1070 can also comprise a processing unit and memory. The processing unit executes computer-executable instructions, and the memory stores control data and computer-executable instructions that enable the controller 1070 to control the flow of compressed air in a respective manner.

Figure 11:
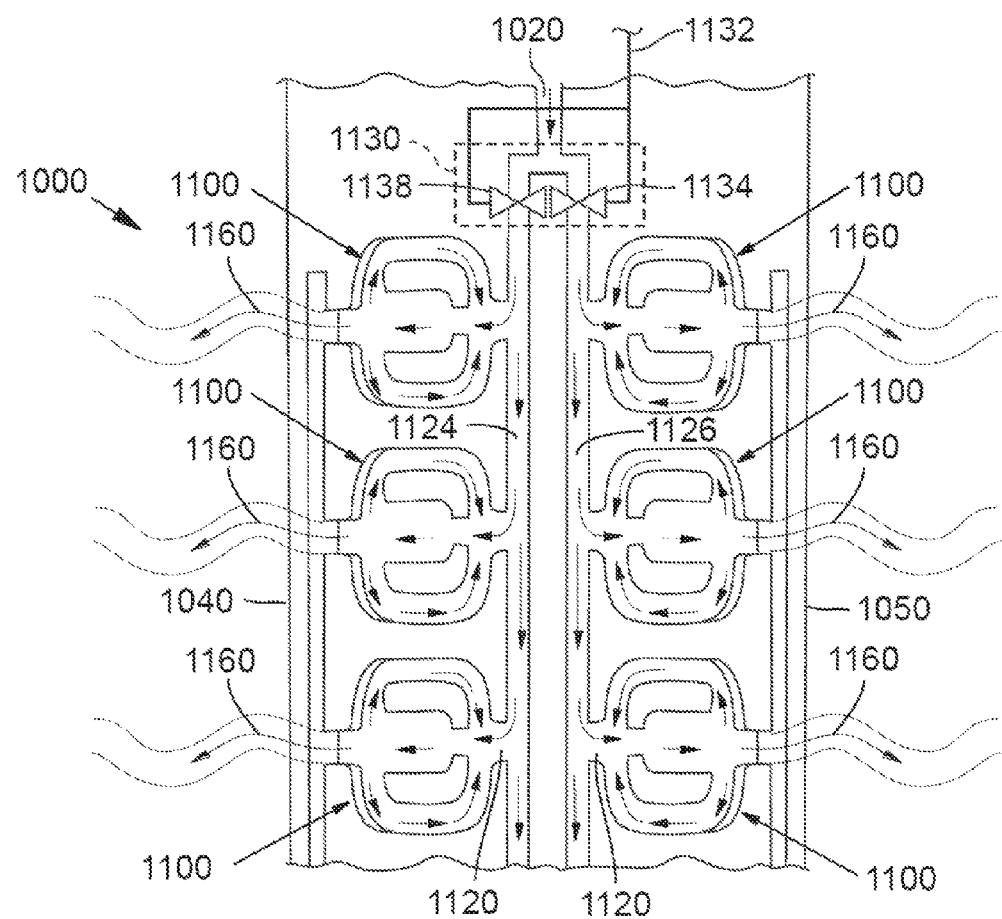
FIG. 11 shows a cross-section of the first embodiment of a rotor blade taken along line 11-11 of FIGS. 10A and 10B.

FIG. 11 shows a cross-sectional view of rotor blade 1000 taken along the line 11-11 of FIGS. 10A and 10B. Multiple sweeping jet actuators 1100 are incorporated into the body of the rotor blade 1000 and are arranged to deliver output jets 1160 to the outer and inner faces 1040 and 1050, respectively, of the rotor blade 1000. The arrows in FIG. 11 indicate the direction of flow of air through the rotor blade 1000. The air is delivered through the conduit 1020 to valves 1134 and 1138. The valves 1134 and 1138 are controlled by a control signal delivered by a control line 1132, and can be part of a valve assembly 1130 within the rotor blade 1000. The valves 1134 and 1138 operate to direct the flow of pressurized air to an outer conduit 1124 or an inner conduit 1126. Thus, the valves 1134 and 1138 provide a way to selectively control whether output jets are discharged to the outer face 1040 or inner face 1050. In other embodiments, the valves 1134 and 1138 can be located in a lower bearing assembly of a VAWT or external to the VAWT, in which case one or more conduits can run through the lower bearing assembly and each of the lower rotor blades. Alternatively, each actuator 1100 can have a respective valve controlling the flow of pressurized air to its respective input 1120, with the control line 1132 (which may comprise more than one control line) extending to each of the valves. The controller 1070 can be connected to the control line 1132 and can generate control signals delivered to the valves.

The oscillating air jets produced by the sweeping jet actuators can operate to control the flow of air over the outer surface of a VAWT rotor blade (e.g., faces 1040, 1050) to delay the occurrence of dynamic stall or to eliminate it entirely. The delay or elimination of dynamic stall allows a VAWT rotor blade to produce lift over a greater portion of the arc traveled by the rotor blade around the VAWT's axis of rotation (FIG. 1). Thus, the use of sweeping jet actuators in VAWT rotor blades increases the efficiency of and power produced by VAWTs.

Sweeping jet actuators can also deliver sufficient thrust to initiate rotation of the VAWT rotor blades. The pressure of the air flow delivered to the sweeping jet actuators can be greater than that delivered during typical operation of the VAWT (i.e., when the VAWT rotor blades are already rotating). The controller 1070 can be configured to execute a "start-up" program that delivers compressed air at a predetermined flow rate or pressure for a predetermined time to initiate rotation of VAWT rotor blades.

The VAWT can comprise sensors that provide feedback to the controller 1070. Sensors can be incorporated into the VAWT to produce data on incident wind speed, rotor blade velocity, period of rotor blade rotation, etc. The controller 1070 can vary the flow rate or pressure of the air delivered to the sweeping jet actuators based on the incident wind speed, the speed of the VAWT rotor blades, and/or other parameters that can be measured by the sensors or calculated from sensor data.

In an exemplary method of operating a VAWT, a concentrated flow of air is provided to a plurality of sweeping jet actuators incorporated in rotor blades of a VAWT. The air can be supplied to stationary rotor blades to initiate rotation of the rotor blades about the vertical rotational axis of the VAWT. The air can continue to be supplied to the upper rotor blades after the rotor blades have begun to rotate. The pressure of the air delivered to the rotor blades to initiate rotation can be different from that supplied to the rotor blades after rotation has begun.

EXAMPLE

Figures 12A, 12B:
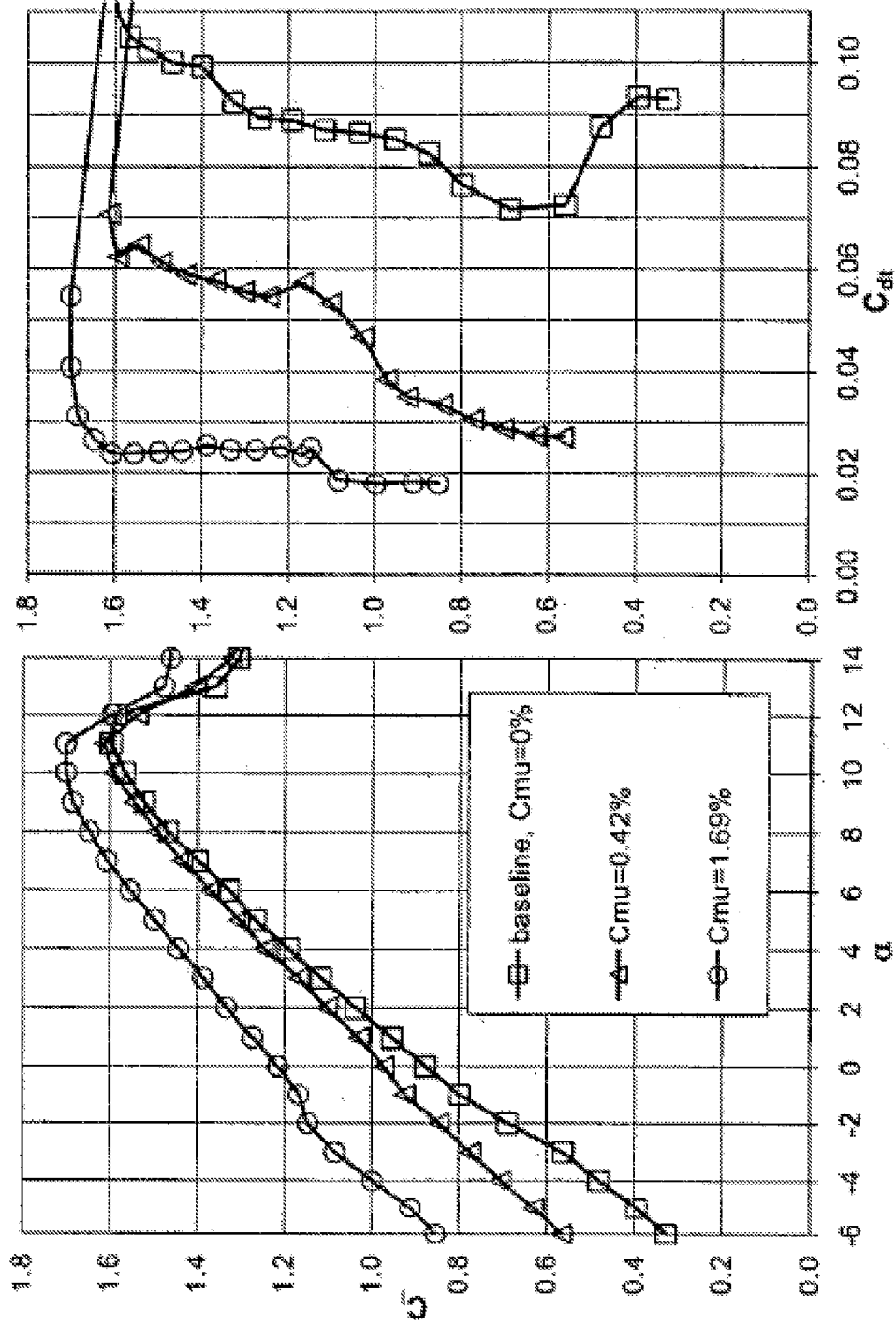
FIG. 12A is a plot of experimental data showing an increase in lift of a NACA 0015 airfoil due to the application of sweeping jet actuators to the airfoil.
FIG. 12B is a plot of experimental data showing the reduction in drag coefficient at a given lift coefficient for a NACA 0015 airfoil due to the application of sweeping jet actuators to the airfoil.

FIGS. 12A-12B show experimental data showing the effect of applying sweeping jet actuators to the flap of a NACA 0015 airfoil. N. Lucas et al. "Discrete Sweeping Jets as Tools for Separation Control," AIAA-2008-3868, 2008, which is incorporated herein by reference in its entirety. NACA airfoils are aircraft wing shapes developed by the National Advisory Committee for Aeronautics (NACA) and the series of digits following the word "NACA" describes the airfoil shape. The NACA 0015 airfoil is symmetrical, the "00" indicating that the airfoil has no camber. The "15" indicates that the airfoil has a 15% thickness to chord length ratio. That is, the airfoil is 15% as thick as it is long. The sweeping jet actuators were placed at the flap shoulder of the airfoil and the flap angle was 30 degrees.

FIG. 12A shows the lift coefficient Cl versus the angle of attack α for three momentum coefficients Cmu. The momentum coefficient is directly proportional to the jet velocity at the nozzle exit of a sweeping jet actuator. Thus, Cmu=0% corresponds to the absence of actuation and Cmu=0.42% and 1.69% correspond to air jets exiting the actuators, the larger Cmu value corresponding to a greater exit jet velocity. FIG. 12B shows the lift coefficient Cl versus the drag coefficient Cdt for the three momentum coefficient values.

FIGS. 12A-12B show that including sweeping jet actuators to the NACA 0015 airfoil can increase lift and reduce drag. At Cmu=0.42% and 1.69%, drag of was reduced for a given lift. At Cmu=0.42%, the lift was increased for lower angles of attack. At Cmu=1.69% flow separation was prevented over a larger attack angle range without increasing the angle at which dynamic stall occurs. For example, at α=−3 degrees, the lift coefficient was increased by 0.5 and for Cl=1 the drag coefficient was reduced by 0.07.

These experimental results indicate that sweeping jet actuators, applied to the leading edges of VAWT rotor blades, improve the ability of a VAWT to generate power because they delay the onset of dynamic stall. This form of actuation increases the lift of an airfoil, with low mass flow and power requirements, and thereby increases the efficiency of power generation using a VAWT.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. A vertical axis wind turbine, comprising:
an upper bearing assembly situated about a vertical rotational axis;
a lower bearing assembly situated about the vertical rotational axis; and
a rotor blade assembly comprising:
a plurality of upper rotor blades, each upper rotor blade comprising an upper end, a lower end, and a plurality of sweeping jet actuators;
one or more upper horizontal members connected to the upper ends of the plurality of upper rotor blades, the one or more upper horizontal members connected to the upper bearing assembly;
one or more lower horizontal members connected to the lower ends of the plurality of upper rotor blades; and
a plurality of lower rotor blades, each lower rotor blade comprising a respective upper end connected to a lower end of one of the upper rotor blades, and a respective lower end connected to the lower bearing assembly;
wherein the rotor blade assembly is rotatable about the vertical rotational axis without a continuous axial shaft extending from the lower bearing assembly to the upper bearing assembly;
wherein each upper rotor blade further comprises one or more conduits for delivering a pressurized flow of air to the plurality of sweeping jet actuators of the upper rotor blade;
wherein the lower bearing assembly comprises one or more main conduits connected to a source of compressed air; and
wherein each lower rotor blade comprises one or more lower rotor blade conduits, each lower rotor blade conduit comprising a respective first end connected to one of the upper rotor blade conduits and a second end connected to the one or more lower bearing assembly main conduits.

2. The vertical axis wind turbine of claim 1, wherein each upper rotor blade is arranged substantially parallel to the vertical rotational axis.

3. The vertical axis wind turbine of claim 1, wherein the one or more upper horizontal members are angularly offset from the one or more lower horizontal members about the vertical rotational axis.

4. The vertical axis wind turbine of claim 1, wherein:
each upper rotor blade comprises a leading edge portion; and
for each upper rotor blade, at least some of the plurality of sweeping jet actuators are incorporated in the respective leading edge portion thereof.

5. The vertical axis wind turbine of claim 1, wherein:
each of the sweeping jet actuators comprises a respective output nozzle;
each upper rotor blade comprises an outer face facing away from the vertical rotational axis and an inner face facing toward the vertical rotational axis; and
each upper rotor blade comprises one or more sweeping jet actuator output nozzles located on the respective outer face arranged symmetrically to one or more sweeping jet actuator output nozzles located on the respective inner face.

6. The vertical axis wind turbine of claim 5, wherein the sweeping jet actuator output nozzles are arranged in respective rows on the outer and inner faces.

7. The vertical axis wind turbine of claim 5, wherein each sweeping jet actuator output nozzle is offset by an angle of approximately between 20 degrees and 90 degrees from the normal of the respective outer or inner face where the respective output nozzle is located.

8. The vertical axis wind turbine of claim 1, wherein:
each lower rotor blade comprises a leading edge portion; and
each lower rotor blade comprises a plurality of sweeping jet actuators arranged along the respective leading edge portion.

9. The vertical axis wind turbine of claim 1, further comprising:
a plurality of angularly spaced supports spaced substantially equi-angularly about and relative to the vertical rotational axis and connected to and extending upward from a base on which the vertical axis wind turbine is located; and
a plurality of guy-lines connecting the upper bearing assembly to the base on which the wind turbine is located, each guy-line being supported by a respective support.

10. The vertical axis wind turbine of claim 9, further comprising a respective tensioning device coupled to each of the plurality of guy-lines, and configured to apply a tension to a respective guy-line such that the plurality of guy-lines collectively impart a lifting force on the rotor blade assembly.

11. The vertical axis wind turbine of claim 1, wherein each upper horizontal member and each lower horizontal member comprises a respective truss comprising a top plate, a bottom plate and a plurality of diagonal supports arranged in a row connecting the top plate to the bottom plate.

12. The vertical axis wind turbine of claim 1, wherein each blade comprises a leading edge and a trailing edge, the rotor blade assembly further comprising one or more braces, each brace connecting the leading edge of a first upper blade to the trailing edge of a second upper blade located opposite the first upper blade.

13. The vertical axis wind turbine of claim 1, wherein the sweeping jet actuators comprise fluidic feedback loops and produce an output jet that oscillates between two divergent angles.

14. A vertical axis wind turbine, comprising:
an upper bearing assembly situated about a vertical rotational axis;
a lower bearing assembly situated about the vertical rotational axis; and
a rotor blade assembly comprising:
a plurality of upper rotor blades, each upper rotor blade comprising an upper end, a lower end, and a plurality of sweeping jet actuators that comprise fluidic feedback loops;
one or more upper horizontal members connected to the upper ends of the plurality of upper rotor blades, the one or more upper horizontal members connected to the upper bearing assembly;
one or more lower horizontal members connected to the lower ends of the plurality of upper rotor blades; and
a plurality of lower rotor blades, each lower rotor blade comprising a respective upper end connected to a lower end of one of the upper rotor blades, and a respective lower end connected to the lower bearing assembly;
wherein the rotor blade assembly is rotatable about the vertical rotational axis without a continuous axial shaft extending from the lower bearing assembly to the upper bearing assembly; and
wherein the sweeping jet actuators produce an output jet that oscillates between two divergent angles.

15. The vertical axis wind turbine of claim 14, wherein:
each of the sweeping jet actuators comprises a respective output nozzle;
each upper rotor blade comprises an outer face facing away from the vertical rotational axis and an inner face facing toward the vertical rotational axis; and
each upper rotor blade comprises one or more sweeping jet actuator output nozzles located on the respective outer face arranged symmetrically to one or more sweeping jet actuator output nozzles located on the respective inner face.

16. The vertical axis wind turbine of claim 15, wherein each sweeping jet actuator output nozzle is offset by an angle of approximately between 20 degrees and 90 degrees from the normal of the respective outer or inner face where the respective output nozzle is located.

17. The vertical axis wind turbine of claim 14, wherein the one or more upper horizontal members are angularly offset from the one or more lower horizontal members about the vertical rotational axis.

* * * * *